US007796611B2

(12) United States Patent
Cohen et al.

(10) Patent No.: US 7,796,611 B2
(45) Date of Patent: *Sep. 14, 2010

(54) METHOD FOR PROVIDING EFFICIENT MULTIPOINT NETWORK SERVICES

(75) Inventors: Yoav Cohen, Kfar Saba (IL); Gilad Goren, Nirit (IL)

(73) Assignee: Alcatel, Paris (FR)

( * ) Notice: Subject to any disclaimer, the term of this patent is extended or adjusted under 35 U.S.C. 154(b) by 1775 days.

This patent is subject to a terminal disclaimer.

(21) Appl. No.: 10/861,528

(22) Filed: Jun. 7, 2004

(65) Prior Publication Data

US 2005/0271036 A1 Dec. 8, 2005

(51) Int. Cl.
*H04L 12/28* (2006.01)

(52) U.S. Cl. .................................. 370/395.53; 370/400
(58) Field of Classification Search ........................ None
See application file for complete search history.

(56) References Cited

U.S. PATENT DOCUMENTS

| | | | |
|---|---|---|---|
| 6,532,088 B1 | 3/2003 | Dantu et al. | |
| 6,680,922 B1 | 1/2004 | Jorgensen | |
| 6,970,475 B1 * | 11/2005 | Fraser et al. | 370/401 |
| 7,088,717 B2 * | 8/2006 | Reeves et al. | 370/392 |
| 2003/0031192 A1 * | 2/2003 | Furuno | 370/409 |
| 2003/0142674 A1 | 7/2003 | Casey | |
| 2004/0081203 A1 * | 4/2004 | Sodder et al. | 370/469 |
| 2004/0165600 A1 * | 8/2004 | Lee | 370/395.53 |
| 2004/0174887 A1 * | 9/2004 | Lee | 370/395.53 |
| 2005/0027782 A1 * | 2/2005 | Jalan et al. | 709/200 |
| 2005/0147104 A1 * | 7/2005 | Ould-Brahim | 370/395.5 |
| 2005/0190757 A1 * | 9/2005 | Sajassi | 370/389 |
| 2006/0143300 A1 * | 6/2006 | See et al. | 709/227 |
| 2008/0279196 A1 * | 11/2008 | Friskney et al. | 370/395.53 |

\* cited by examiner

*Primary Examiner*—Phirin Sam
(74) *Attorney, Agent, or Firm*—Carmen Patti Law Group, LLC

(57) ABSTRACT

A method, system and device for enabling efficient bandwidth utilization of a multipoint network service over an arbitrary topology network that includes a plurality of network elements (NEs). In a preferred embodiment, the method comprises the steps of setting up a full connectivity between the NEs and providing the multipoint network service using the full connectivity, whereby data packets of the multipoint network services are transmitted from a source NE to at least one edge NE through at least one intermediate NE, and whereby data packets that need to be flooded are not replicated or at the source NE. The full connectivity includes an arbitrary combination of a first plurality of point-to-multipoint connections between each source NE and each edge NE and a second plurality of point-to-point connections between each source NE and every edge NE.

18 Claims, 11 Drawing Sheets

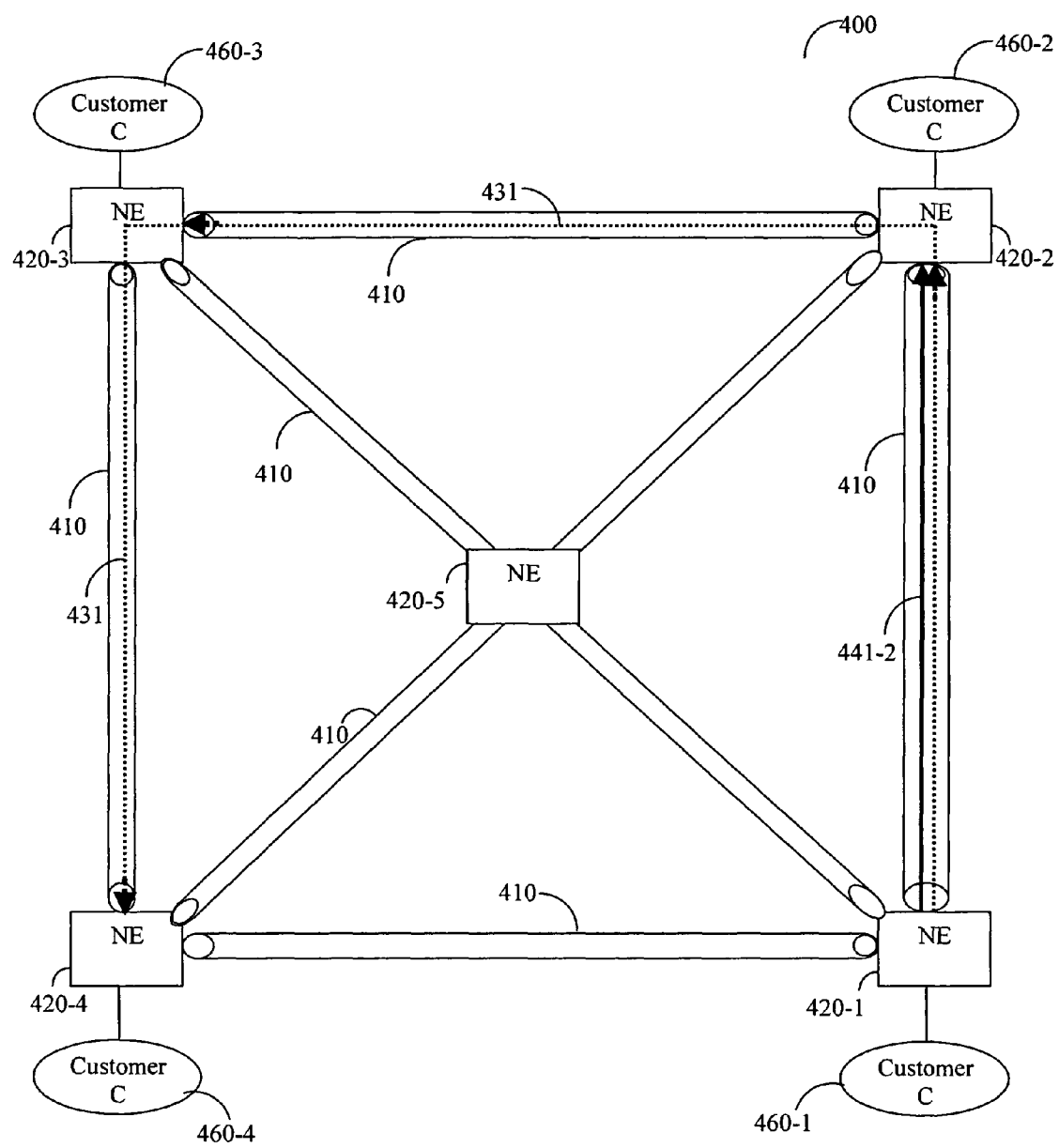
FIRGURE 4B

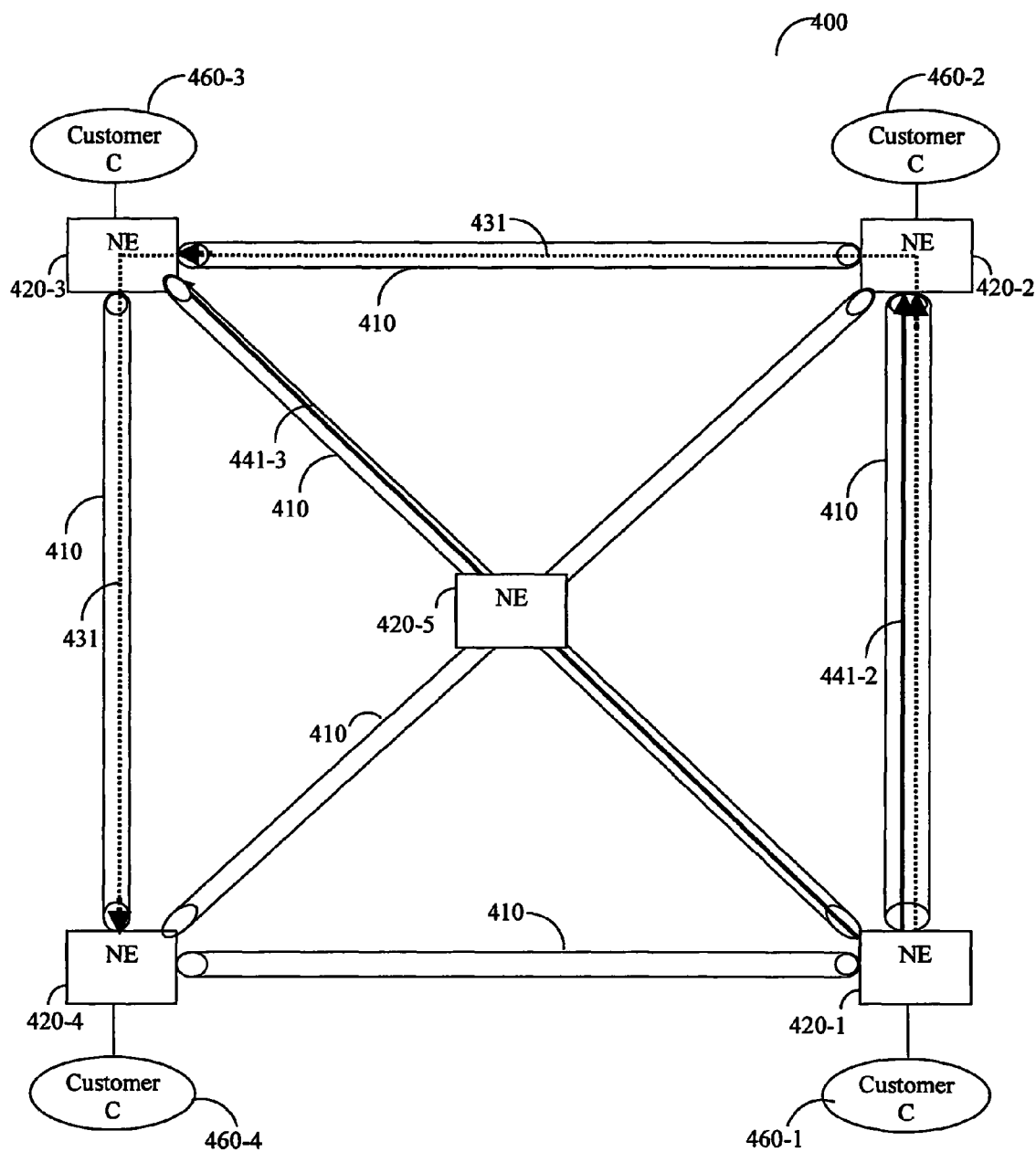
FIRGURE 4C

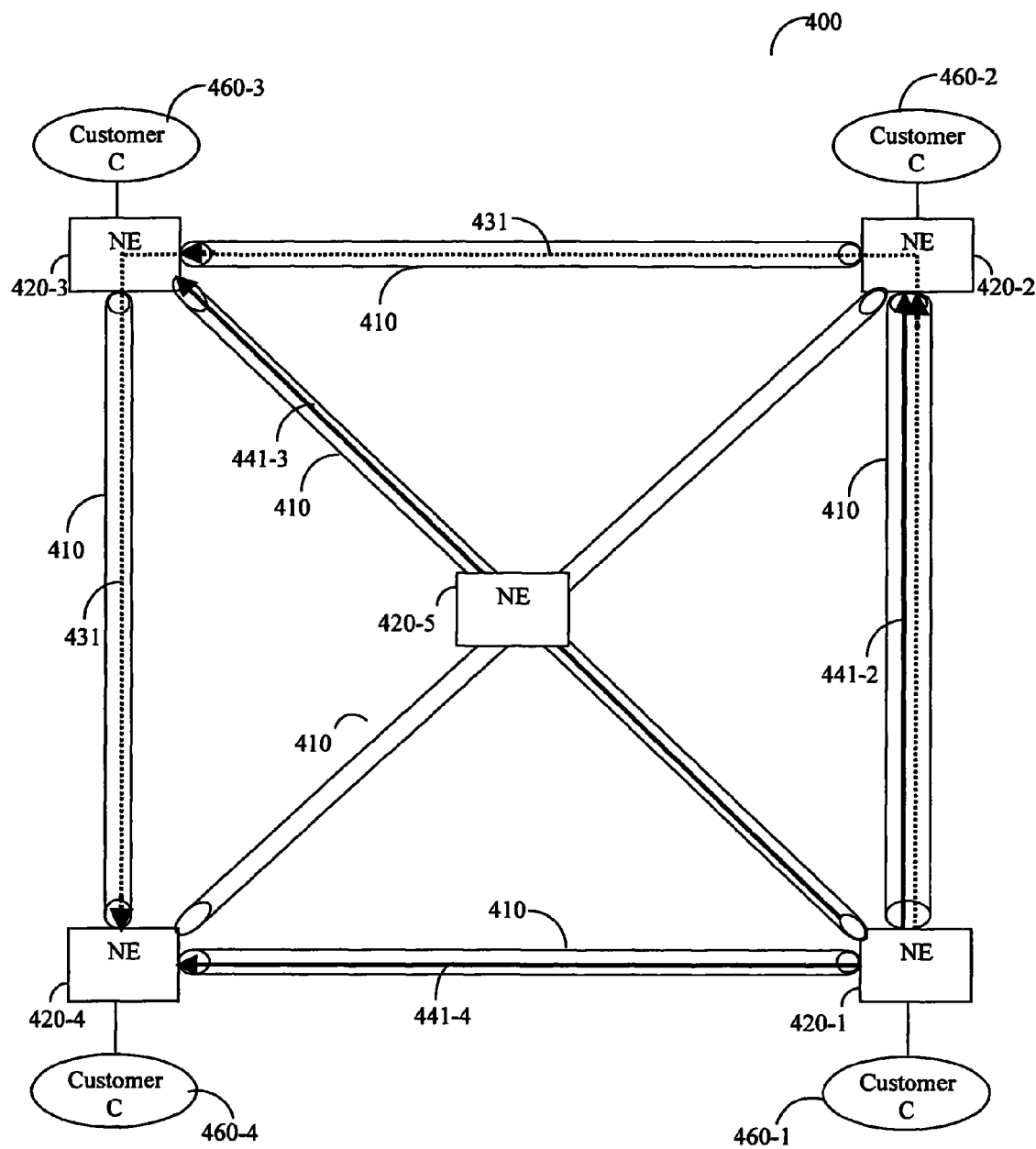
FIRGURE 4D

| DNE2DL 352 ||
|---|---|
| Network Element / default label | Destination label |
| 420-2 / 992 | 12 |
| 420-3 / 993 | 13 |
| 420-4 / 994 | 14 |
|  |  |

FIGURE 6A

| DA2DL Table 350 ||
|---|---|
| Destination address | Destination label |
| xyz | 12 |
| yyy | 13 |
| zzz | 14 |
|  | 991 |
|  |  |

FIGURE 6B

METHOD FOR PROVIDING EFFICIENT MULTIPOINT NETWORK SERVICES

FIELD OF THE INVENTION

The present invention relates generally to virtual private networks, and in particular to methods and system for enabling the operation of virtual private local area network (LAN) services.

BACKGROUND OF THE INVENTION

Ethernet has emerged as the standard of choice for local area networks. With speeds of 10 Mbps, 100 Mbps, 1 Gbps, and 10 Gbps, Ethernet capacity has grown to meet the need for increased network capacities. Consequently, there is considerable interest by operators to offer multipoint network services over public networks. A multipoint network service is a service that allows each of the customer sites to communicate directly and independently with all other customer sites connected to the network through a single interface.

A new network technology that renders multipoint connectivity services has been introduced recently in U.S. patent application Ser. No. 10/265,621 by Casey. This technology is known as "virtual private LAN service" (VPLS). VPLS is a multipoint Layer 2 virtual private network (VPN) technology that allows multiple sites to be connected over a emulated Ethernet broadcast domain that is supported across, for example, multi-protocol label switching (MPLS) networks. That is, VPLS provides connectivity between geographically dispersed customer sites across metropolitan area networks (MANs) or wide area networks (WANs), seemingly as if the customer sites were connected using a LAN.

Abstractly, a VPLS can be defined as a group of virtual switch instances (VSIs) that are interconnected in a full mesh topology to form an emulated LAN. Specifically, a full mesh of connections, i.e., pseudowires (PWs) needs to be established between network elements (NEs) participating in a single VPLS. Concretely, a VSI can be seen as a bridging function, in which a packet is switched based upon its destination address "DA" (e.g., a medium access layer (MAC) address) and membership in a VPLS. If the packet destination address is unknown, or is a broadcast or multicast address, the packet is flooded (i.e., replicated and broadcasted) to all connections, i.e. PWs associated with the VSI. All NEs participating in a single VPLS instance appear to be on the same LAN.

Reference is now made to FIG. 1, which shows a VPLS 100 established between sites 110, 112, 114 and 116 of a customer A. Sites 110, 112, 114 and 116 are served by NEs 120, 122, 124 and 126 respectively. Each site is connected to an output port of each NE through a customer edge (CE) device (not shown). The VPLS is formed by a full mesh of PW connections 130 that interconnect NEs 120 through 126. The PW connections are carried over a MPLS network 150.

NEs in VPLS 100 need to support a "split-horizon" scheme in order to prevent loops. Namely, a NE in VPLS 100 is not allowed to forward traffic from one PW to another PW in the same VPLS. Furthermore, each NE in VPLS 100 needs to implement basic bridging capabilities, such as flooding packets and replicating packets, as well as learning and aging (to remove unused) destination addresses. A packet received at a source NE (e.g. NE 120) is transmitted to its destination based on the DA designated in the packet. If the source NE (120) does not recognize the destination NE associated with the DA, the packet is flooded to all other NEs in VPLS 100.

A packet to be flooded is replicated in as many copies as the number of PWs 130 connected to a NE, namely, a packet is replicated on all connections that are associated with a particular VSI. The number of VPLS replications increases linearly as the number of connections in the VSI increases. The number of connections in a VSI is equal to the number of NEs minus one. This replication is not as efficient as the mechanism for transmitting flooded traffic with a physical device based on Ethernet switching technology, in which flooded traffic is transmitted only once per physical interface.

The primary shortcoming of VPLS and other network services that emulate multipoint connectivity lies in the broadcast and multicast packet replications that are performed at a source NE. These replications significantly limit the bandwidth utilization when providing such network services. Furthermore, replicating packets and transmitting them at wire speed may not be feasible. Therefore, it would be advantageous to eliminate the shortcomings resulting from broadcast replication.

SUMMARY OF THE INVENTION

According to the present invention there is provided a method for enabling efficient bandwidth utilization of a multipoint network service over an arbitrary topology network that includes a plurality of NEs, comprising the steps of: setting up a full connectivity between the NEs of the arbitrary topology network that participate in the multipoint network service; and, providing the multipoint network service between the NEs using the full connectivity, whereby data packets of the multipoint network services that have to be flooded are transmitted from one NE that serves as a source NE to at least one other NE that serves as an edge NE and may be transmitted through at least one other NE that serves as an intermediate NE, and whereby when data packets needs to be flooded they are not replicated at the source NE.

According to the present invention there is provided a network element operative to enable efficient bandwidth utilization of a multipoint network service over an arbitrary topology network, comprising a virtual connection selector (VCS) capable of mapping incoming data packets to connections, and a forwarding unit coupled to the VCS and configured to perform a forwarding function on each data packet, whereby the NE may communicate with other NEs sharing the multipoint network service over the arbitrary topology network.

According to the present invention there is provided a system for efficient bandwidth utilization of a multipoint network service over an arbitrary topology network, the system comprising a plurality of network elements (NEs), each NE operative to provide a forwarding function, and a full connectivity mechanism that facilitates multipoint network services between all the NEs on the arbitrary topology network.

BRIEF DESCRIPTION OF THE DRAWINGS

FIG. 6 is an example for the contents of a destination address to destination label (DA2DL) mapping table and a destination NE-to-a-destination label (DNE2DL) mapping table;

DETAILED DESCRIPTION OF THE PREFERRED EMBODIMENTS

The present invention discloses a method, system and device for providing efficient multipoint network services established over a physical network of an arbitrary physical topology. According to a preferred embodiment of the method, point-to-point (P2P) connections and point-to-multipoint (P2MP) connections are established between network elements providing the same network service. Transferring packets through these connections significantly improves the bandwidth utilization of the underlined network.

Figure 1:
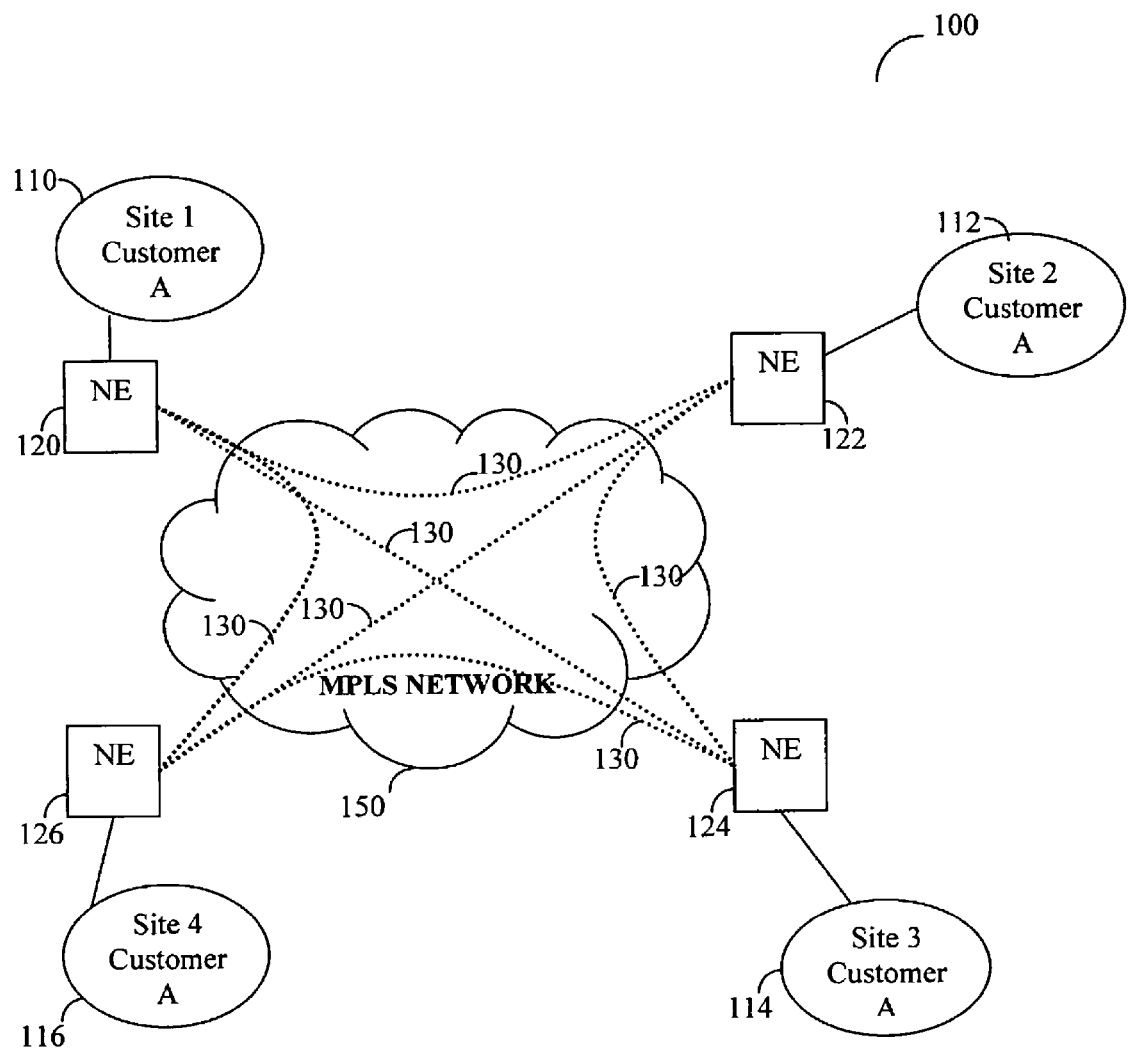
FIG. 1 is an exemplary VPLS network (prior-art)
Figure 2:
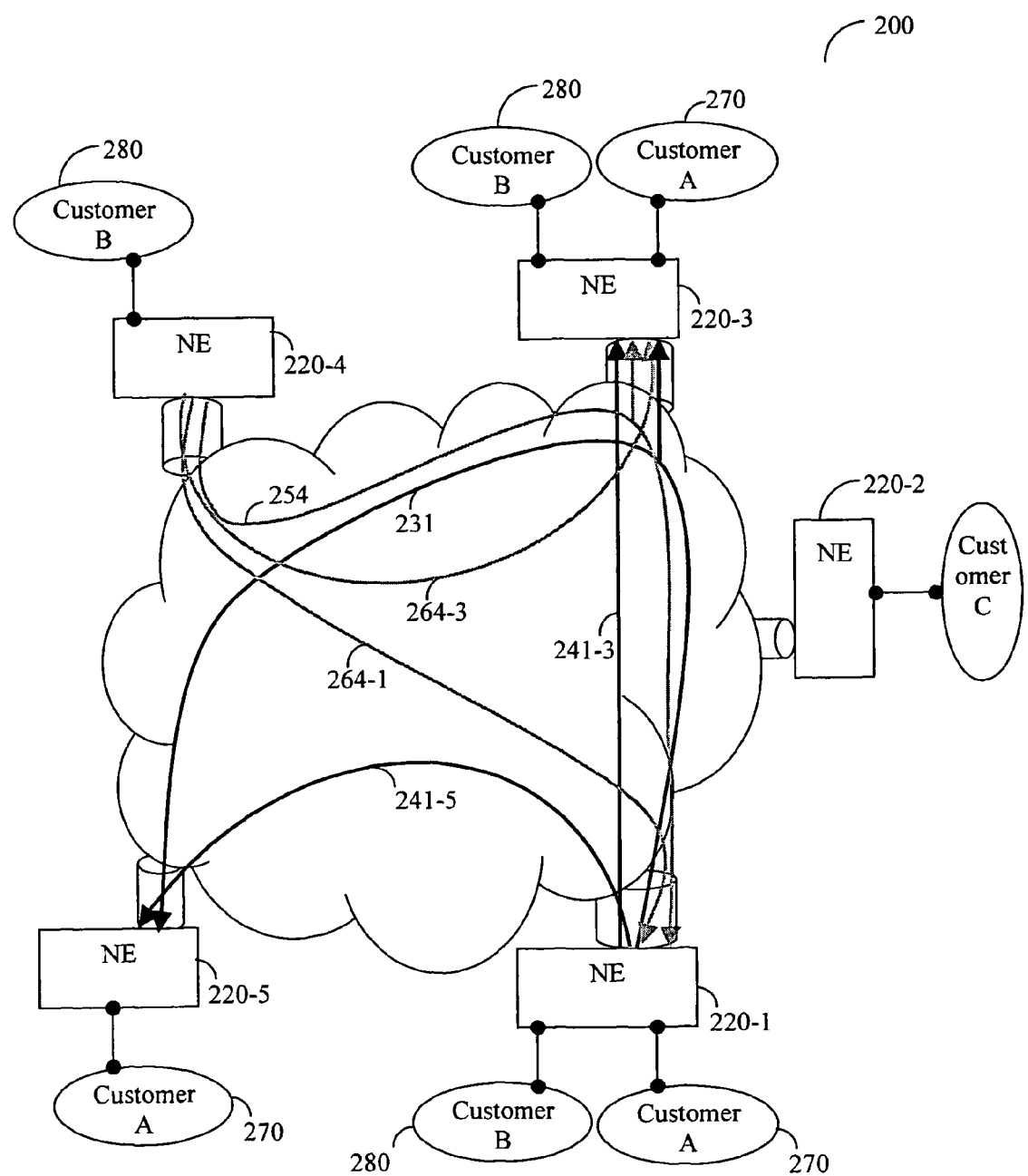
FIG. 2 is an illustration of a network used to demonstrate the principles of the present invention.

Reference is now made to FIG. 2, which shows an illustration of a network 200 used to highlight the principles of the present invention. Network 200 is a logical network established over a physical network of arbitrary topology, e.g., mesh, partial mesh, and so on. The physical network may be, but is not limited to, a synchronous optical network (SONET), a synchronous digital hierarchy (SDH) network, a resilient packet ring (RPR) network, a Frame Relay network or a T3/E3 network.

Network 200 comprises five NEs 220-1 through 220-5 connected to sites 270 of a customer A and to sites 280 of a customer B. Each site is connected to an output port of each NE 220 through a customer edge (CE) device (not shown). Each NE 220 is capable of forwarding labeled packets to other NEs through the underlying network. NEs 220-1, 220-3, and 220-5 establish a VPLS between the sites 270 of customer A (hereinafter "VPLS-A"), while NEs 220-1, 220-3 and 220-4 establish a VPLS between the sites 280 of customer B (hereinafter "VPLS-B"). Note that NE 220-2 is connected to a site of customer C and does not participate in either VPLS-A or VPLS-B. Also note that NE 220-1 and NE 220-3 participate in both VPLS-A and VPLS-B. Network 200 may be, but is not limited to, a MPLS network where a mesh of MPLS transport tunnels (not shown) is established between NEs 220.

To allow the operation of a VPLS, a full connectivity needs to be established between NEs 220 of a particular VPLS. In accordance with this invention, this is effected by creating P2P connections and P2MP connections between the NEs 220 participating in the same VPLS. Specifically, a full connectivity is achieved by a full mesh of n*(n−1) P2P unidirectional connections, 'n' P2MP connections, or any combination of P2P connections and P2MP connections. FIG. 2 shows only connections originating from NE 220-1 and NE 220-4. The connections originating from NE 220-1 are: a P2MP connection 231 that connects NE 220-1 to NE 220-3 and NE 220-5 of VPLS-A, a P2P connection 241-3 from NE 220-1 to NE 220-3, and a P2P connection 241-5 from NE 220-1 to NE 220-5. The connections originating from NE 220-4 are: a P2MP connection 254 that connects NE 220-4 to NE 220-3 and NE 220-1 of VPLS-B, a P2P connection 264-1 from NE 220-4 to NE 220-1, and a P2P connection 264-3 from NE 220-4 to NE 220-3.

Generally, a VPLS comprises 'n' NEs, where from each NE 'n' connections are created at most, i.e., at most 'n−1' unidirectional P2P connections and at most single unidirectional P2MP connection. Hence, the number of connections required to be established between 'n' NEs participating in a VPLS is at most 'n*(n−1)' unidirectional P2P connections and 'n' additional unidirectional P2MP connections. The connections may be passed through one or more NEs that are not participated in the VPLS. The creation of the P2P and the P2MP connections is described in greater detailed below. In one embodiment of this invention, the P2MP connections and the P2P connections are established through PWs over MPLS transport tunnels. Specifically, the P2MP connections are established through multipoint PWs over multipoint MPLS transport tunnels or through multipoint PWs over P2P MPLS transport tunnels.

To allow for the functionality of the P2P and the P2MP connections, each NEs (e.g., NEs 220) implements at least one of the following functions: 'replicate-and-forward', 'drop-and-forward', 'drop', 'forward', 'replicate-drop-and-forward' or a combination thereof. The drop function terminates a connection and drops packets at a specific NE with the aim of sending them to one or more CE devices of a customer site connected to the specific NE. The forward-function forwards packets from a NE to an immediately adjacent NE, which may or may not participate in the VPLS. It should be noted that if a NE does not participate in a specific VPLS service, it is configured to forward or replicate-and-forward all traffic that belongs to that specific VPLS. The replicate-and-forward function replicates internally an incoming packet and forwards copies of the replicated packet to NEs connected to the replicating NE. The drop-and-forward function replicates an incoming packet internally in a NE, sends a copy of the replicated packet to one or more CE devices connected to the NE, and forwards the packet to another NE. The replicate-drop-and-forward function replicates internally an incoming packet, forwards multiple copies of the replicated packet to NEs connected to the replicating NE, and sends a copy of the packet to one or more CE devices connected to the replicating NE. For each connection, NEs are configured with the appropriate functions. Specifically, for the operation of the P2P connections the NEs are configured to perform only the forward function or the drop function. For the operation of the P2MP connections the NEs are configured to perform the forward function, the drop function, the drop-and-forward function, the replicate-and-forward function, or the replicate-drop-and-forward function. However, in some implementations, the operation of P2MP connections can be utilized by configuring the NEs to perform only the drop or drop-and-forward functions. In addition, a NE is capable of learning destination addresses, as described in greater detailed below.

Figure 3:
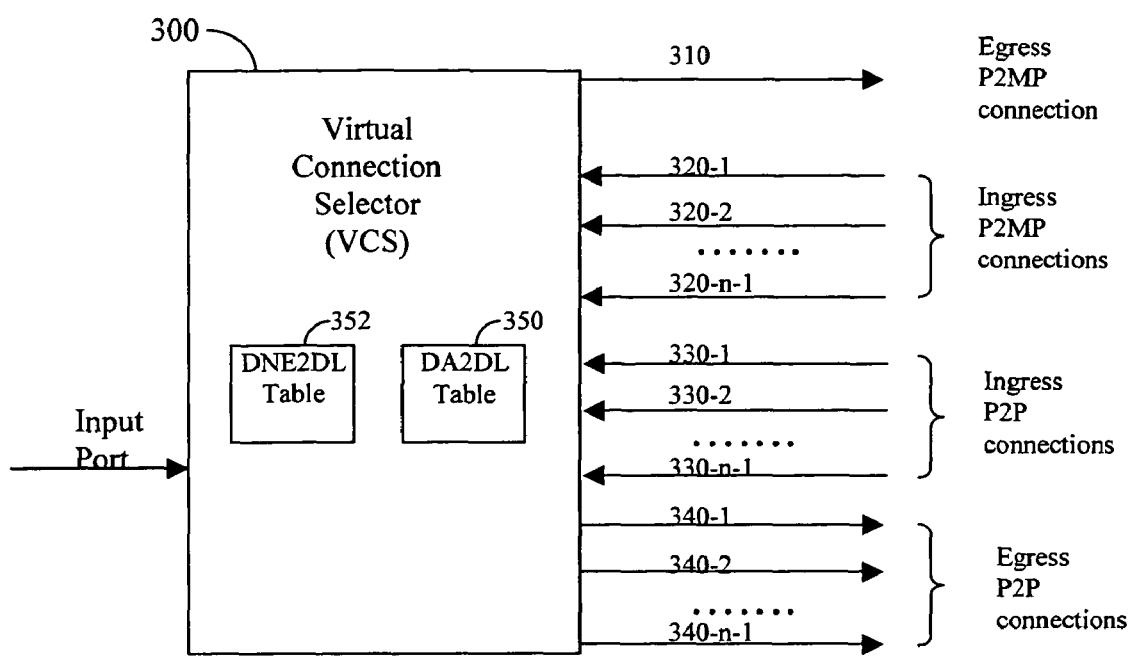
FIG. 3 is an exemplary diagram of virtual connection selector (VCS)

The VPLS is realized through a virtual connection selector (VCS) and a forwarding unit. The VCS executes all activities related to mapping incoming packets to connections while the forwarding unit executes activities related to forwarding packets. A VCS is included in each NE connected to at least one CE device. Note that there is a VCS for each provided multipoint network service. A schematic diagram of a VCS 300 is shown in FIG. 3. VCS 300 includes virtual interfaces 310, 320, 330 and 340. Interface 310 is an egress for a P2MP connection used for flooded transmissions, interfaces 320-1 through 320-n-1 are ingresses of 'n−1' incoming P2MP connections, interfaces 330-1 through 330-n-1 are ingresses of 'n−1' incoming P2P connections, and interfaces 340-1 through 340-n-1 are egresses of 'n−1' outgoing P2P connections. It should be noted that if a partial mesh of P2P connections is established, the number of ingresses and egresses connections may be less than 'n−1' on each interface.

VCS 300 further includes a destination address to a destination label mapping ("DA2DL") table 350 and a destination NE to a destination label mapping ("DNE2DL") table 352. VCS 300 of a source NE assigns a destination label to each incoming packet received on an input port. Specifically, a destination label is assigned to a packet according to its destination address. Each destination label is associated with a different connection. The mapping information of destination addresses to destination labels is kept in DA2DL table 350. DNE2DL table 352 maintains the mapping information of destination NEs to P2P connections. The content of DA2DL table 350 and DNE2DL table 352 may be preconfigured or dynamically updated. Specifically, DA2DL table 350 can be dynamically configured through a learning procedure described in greater detail below. VCS 300 is included in each NE connected to a customer site.

Figure 8:
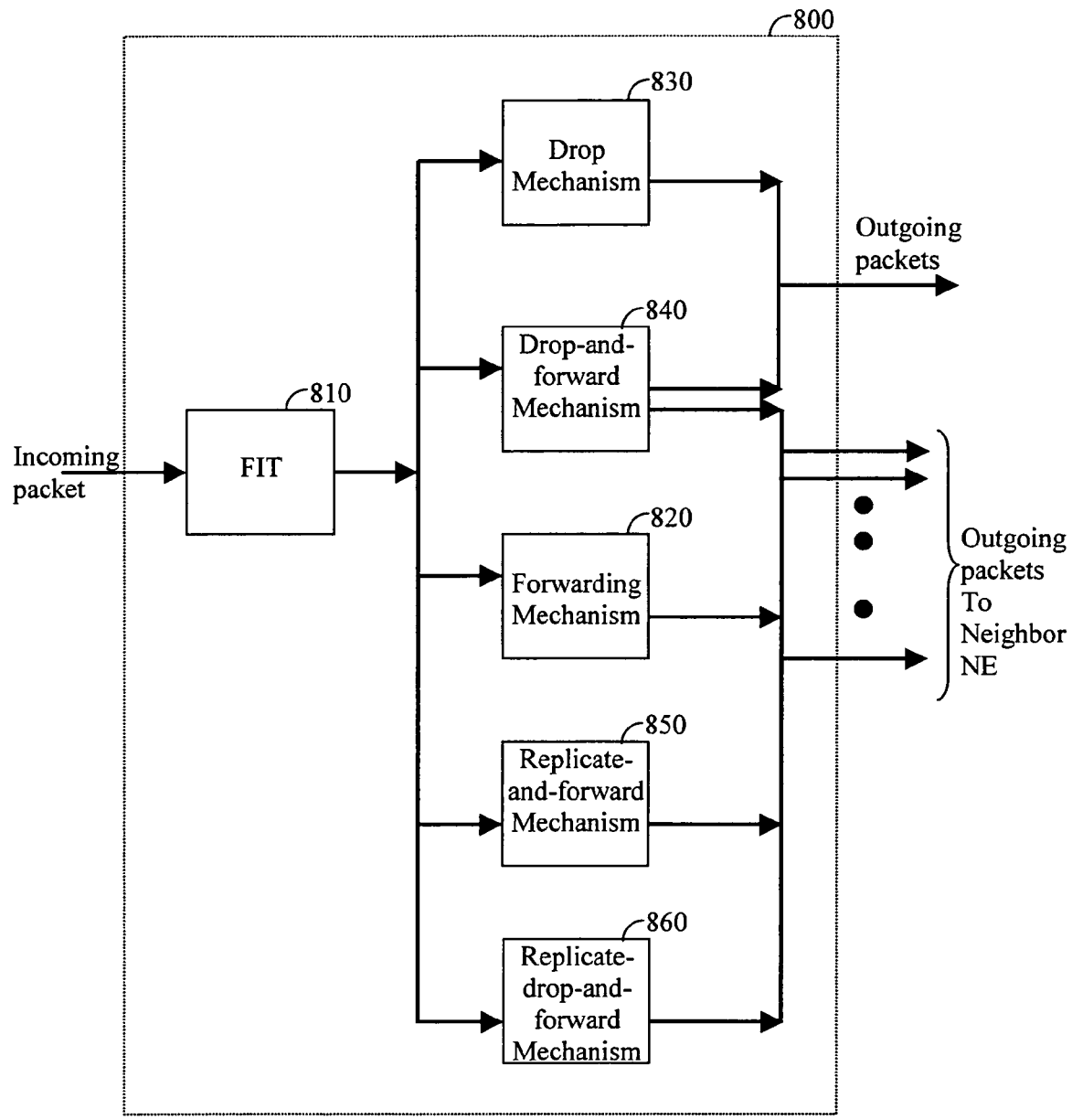
FIG. 8 is an exemplary diagram of a forwarding unit.

The forwarding unit is included in each NE in the network and is capable of performing the replicate-drop-and-forward, replicate-and-forward, drop-and-forward, drop, and forward functions. A schematic diagram of the forwarding unit 800 is provided in FIG. 8. Forwarding unit 800 includes a forwarding information table (FIT) 810, a forwarding mechanism 820 operative to execute the forward function, a drop mechanism 830 operative to execute the drop function, a drop-and-forward mechanism 840 operative to execute the drop-and-forward function, and a replicate-and-forward mechanism 850 operative to execute the replicate-and-forward function. The replicate-drop-and-forward function is executed by utilizing a combination of multiple units of forwarding unit 800 or a replicate-drop-and-forward mechanism 860. Packets are transmitted along an established connection where each forwarding unit 800 along the path of the connection makes forwarding decisions based solely on the content of the destination label. Forwarding unit 800 maintains the forwarding information in FIT 810. The FIT indicates per each destination label how to handle the packet, i.e., drop, forward, drop-and-forward, replicate-and-forward, or replicate-drop-and-forward. In NEs connected to customer sites, forwarding unit 800 may be coupled to VCS 300.

Figure 4A:
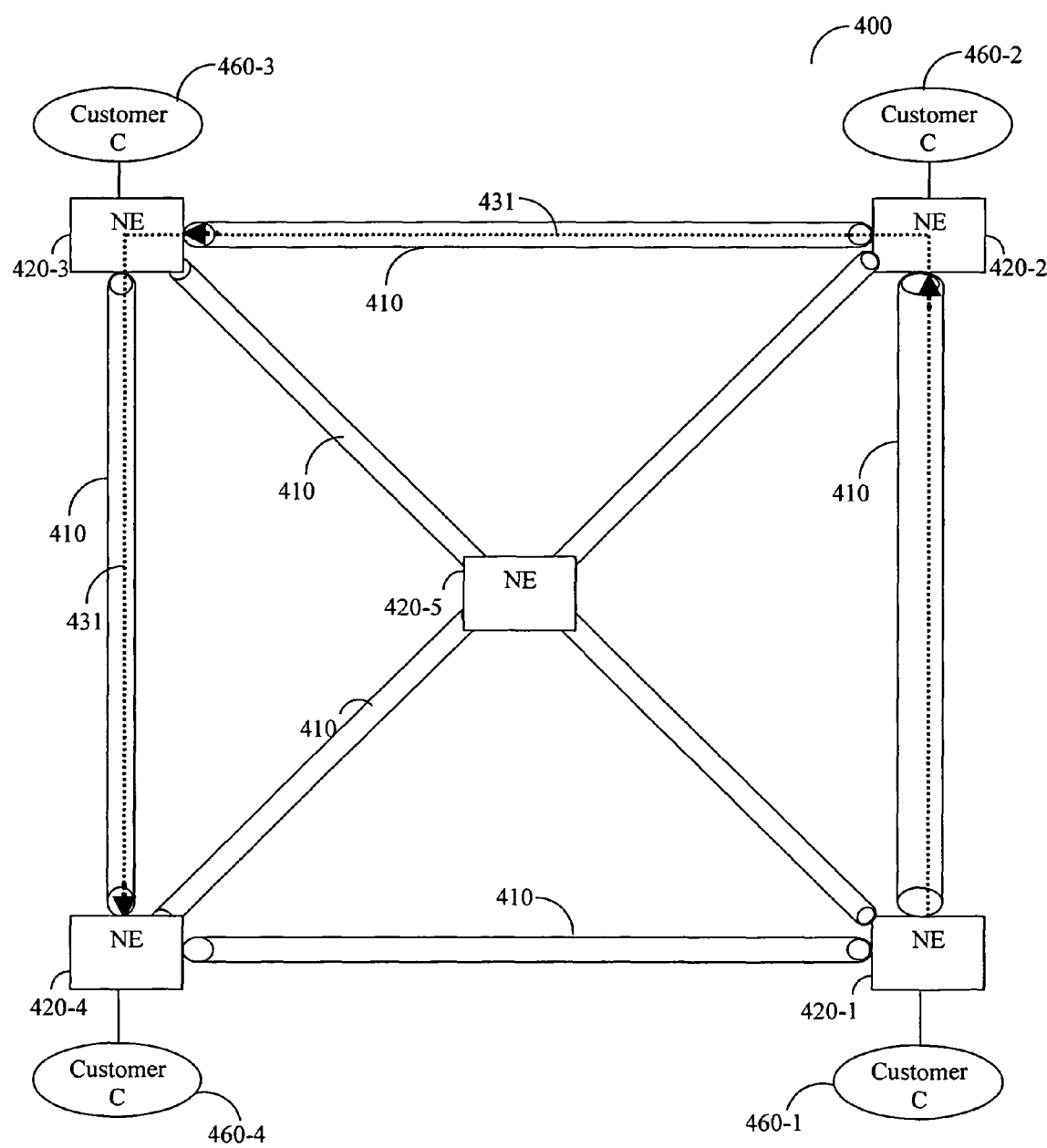
FIG. 4 is an example for building a VPLS in accordance with the present invention

FIG. 4A shows a non-limiting example of building a VPLS in accordance with the present invention. FIG. 4A shows a virtual network 400 that includes five NEs 420-1, 420-2, 420-3, 420-4, and 420-5 connected through MPLS transport tunnels 410. Only NEs 420-1 through 420-4 participate in the VPLS established between the sites of customer C 460-1 through 460-4 respectively. NE 420-5 is not connected to any customer site. The VPLS is established by creating a single P2MP connection and three P2P connections for NEs 420-1, 420-2, 420-3, and 420-4, i.e., a total of sixteen connections. For ease of description, only connections originating in NE 420-1 are shown. In this example, the P2P connections and the P2MP connections are carried over the MPLS transport tunnels 410. However, these connections can be carried over transport means other than the MPLS.

As shown in FIG. 4A, a P2MP connection 431 is established between NE 420-1 and NEs 420-2 through 420-4 by configuring each of NEs 420-2, 420-3, and 420-4. Specifically, for the creation of connection 431, NE 420-2 and NE 420-3 are configured to operate in a drop-and-forward mode, while NE 420-4 is configured to operate in a drop mode. Furthermore, one of the destination labels is designated as a default label and associated with P2MP connection 431. For example, the default label associated with connection 431 is '991'. Alternatively, the P2MP connection may be established between NE 420-1 to NE 420-5, and from NE 420-5 the connection is split to three NEs 420-2, 420-3, and 420-4. This is achieved by configuring NE 420-5 to perform a replicate-and-forward function. Subsequently, three more P2MP connections are created from NEs 420-2, 420-3, and 420-4.

Next, the P2P connections are established, where a single connection is added at a time. As shown in FIG. 4B, a P2P connection 441-2 is set up between NE 420-1 and NE 420-2. This is achieved by configuring NE 420-2 to operate on connection 441-2 in a drop mode and by notifying NE 420-2 with a label associated with connection 441-2. The label associated with connection 441-2 is '12'. As shown in FIG. 4C, a P2P connection 441-3 is set up between NE 420-1 and NE 420-3, by configuring NE 420-5 to operate in a forward mode and NE 420-3 to operate in a drop mode. As well, NE 420-3 is notified with a label associated with connection 441-3. The label associated with connection 441-3 is '13'. Alternatively, the P2P connection 441-3 can be established over a direct tunnel through the underlying physical network between 420-1 and 420-3 (if such a tunnel exists). Hence, the P2P connection 441-3 goes through 420-5 transparently. The process of building the VPLS continues by adding another P2P connection 441-4 through a transport tunnel 410 connection between NE 420-1 and NE 420-4. This is done through configuring NE 420-4 to operate in a drop mode. Further, NE 420-4 is notified with a label associated with connection 441-4. The label associated with connection 441-4 is '14'. All connections originating from NE 420-1 are shown in FIG. 4D. The process for creating P2P connections is thereafter repeated, at most, three more times for each of NEs 420-2, 420-3, and 420-4. The P2P connections can be configured to transfer traffic at an optimized bandwidth. The actual P2P connection bandwidth is determined by the service level defined for the VPLS. For optimization purpose, the bandwidth to be allocated is calculated for P2P connections while the P2MP connections may utilize the same allocated bandwidth, where the topology overlaps.

The creation of P2P and P2MP connections can be executed manually by means of a network management system (NMS) or command line interface (CLI) or automatically by means of a signaling protocol.

In accordance with this invention, flooded packets are preferably transmitted over a P2MP connection. This significantly reduces the number of packet replications performed at a source NE. For example, a packet with an unknown destination address received at NE 420-1 is transmitted over P2MP connection 431. Subsequently, the packet is received at NE 420-2, which replicates the packet only once and forwards a copy of the packet to NE 420-3 which handles the incoming packet in the same manner as does NE 420-2. Once a packet is received at NE 420-4 the packet is sent to a customer site connected the NE 420-4. As can be understood from this example, a packet to be flooded is replicated internally only once at NEs 420-2 and 420-3. This contrasts with prior art solutions, in which a packet to be flooded is replicated at the source NE (e.g., NE 420-1) to as many as the number of NEs that are associated with a particular VPLS (e.g. three times). However, replicating packets not at the source NE rather at arbitrary NEs on the network significantly increases traffic efficiency and decreases network congestion, as fewer packets are transferred over the network. For example, in the prior art, three copies of the same packet travel between 420-1 and 420-2.

It should be noted by one skilled in the art that the implementation of the VPLS discussed hereinabove is merely one embodiment of the disclosed invention. For example, another approach is to create the P2P connections first and then add the P2MP connections. However, where P2MP connections are not created, packet replication must be performed. Yet another approach is to create the P2MP connections first, and then create the P2P connections dynamically following the real traffic patterns.

In accordance with this invention, the P2P connections are associated with DAs, e.g., medium access layer (MAC) addresses. The association between a P2P connection and a DA may be performed either by manual configuration, e.g, using a NMS or by using a learning procedure. A NMS defines for each DA a respective destination label associated with a P2P connection. A source NE (e.g., NE 420-1) determines the DA of an incoming packet and sends the packet over a P2P connection associated with the designated DA.

Figure 5:
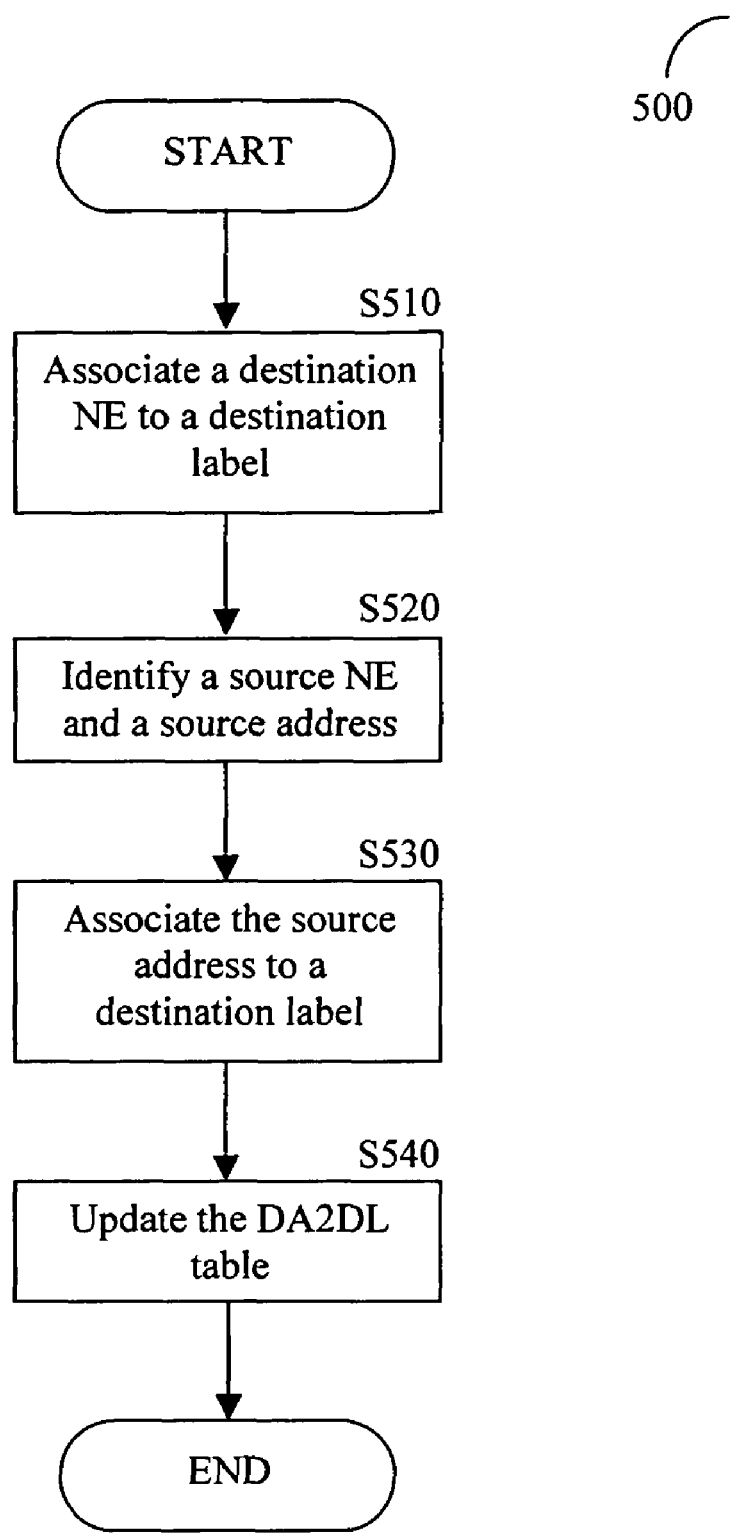
FIG. 5 is non-limiting flowchart describing a learning procedure in accordance with the present invention.

FIG. 5 shows a non-limiting flowchart 500 describing the operation of the learning procedure in accordance with this invention. The learning procedure associates P2P connections with destination addresses and dynamically updates the content of DA2DL table 350. In step S510, for each NE, a P2P connection is associated with a destination NE by means of a NMS or signaling. The relations between destination NEs and P2P connections are saved in DNE2DL table 352. In step S520, a "learning" NE that receives a packet on a P2MP connection identifies the source address (SA) and the source NE of the incoming packet. The source NE is identified by the point-to-multipoint on which the packet is transmitted. That is, a packet sent over a point-to-multipoint connection includes a default label, this label permitting to identified the source NE. For example, the packet transmitted over point-to-multipoint connection 431 is associated with the default label '991'. Hence, a "learning" NE that receives a packet with the label '991' concludes that the source NE is 420-1. In step S530, the SA is associated with a P2P connection directing to the source NE. This is performed by searching the DNE2DL table for a destination label related to the source NE. In step S540, the SA and the destination label found in the DNE2DL table are saved in DA2DL table 350 of the learning NE. Specifically, the source address is saved in DA2DL table 350 as a DA and the source NE is saved as the destination NE.

As an example, FIG. 6A shows a DNE2DL table 352 configured by a NMS for NE 420-1. A packet sent from source NE 420-3 over a P2MP connection includes a source address of 'yyy' and a default label (e.g., '993') identifying source NE 420-3. When this packet is received at NE 420-1, the default label and the source address are identified. Next, the label associated with source NE 420-3 is searched in DNE2DL table 352. This label relates to a P2P connection directing from NE 420-1 to NE 420-3. As shown in FIG. 6A, NE 420-3, identified using the default label 993, is associated with a destination label '13'. Once the source NE is associated a destination label, the source address 'yyy' is linked up with the label '13'. This relation is saved in DA2DL table 350.

FIG. 6B shows the content of DA2DL table 350 of NE 420-1. DA2DL table 350 includes a list of DAs, each DA relating to a destination label. A destination label determines on which connection to transmit the packets. For instance, a packet having a DA of 'xyz' is associated with a destination label '12' and will be transmitted over P2P connection 441-2, a packet having a DA of 'yyy' is associated with a destination label '13' and will be transmitted over P2P connection 441-3, a packet having a DA of 'zzz' is associated with a destination label '14' and will be transmitted over P2P connection 441-4, and a packet with a multicast of broadcast DA or with unknown DA is associated with a default label '991' and will be transmitted over P2MP connection 431.

Figure 7:
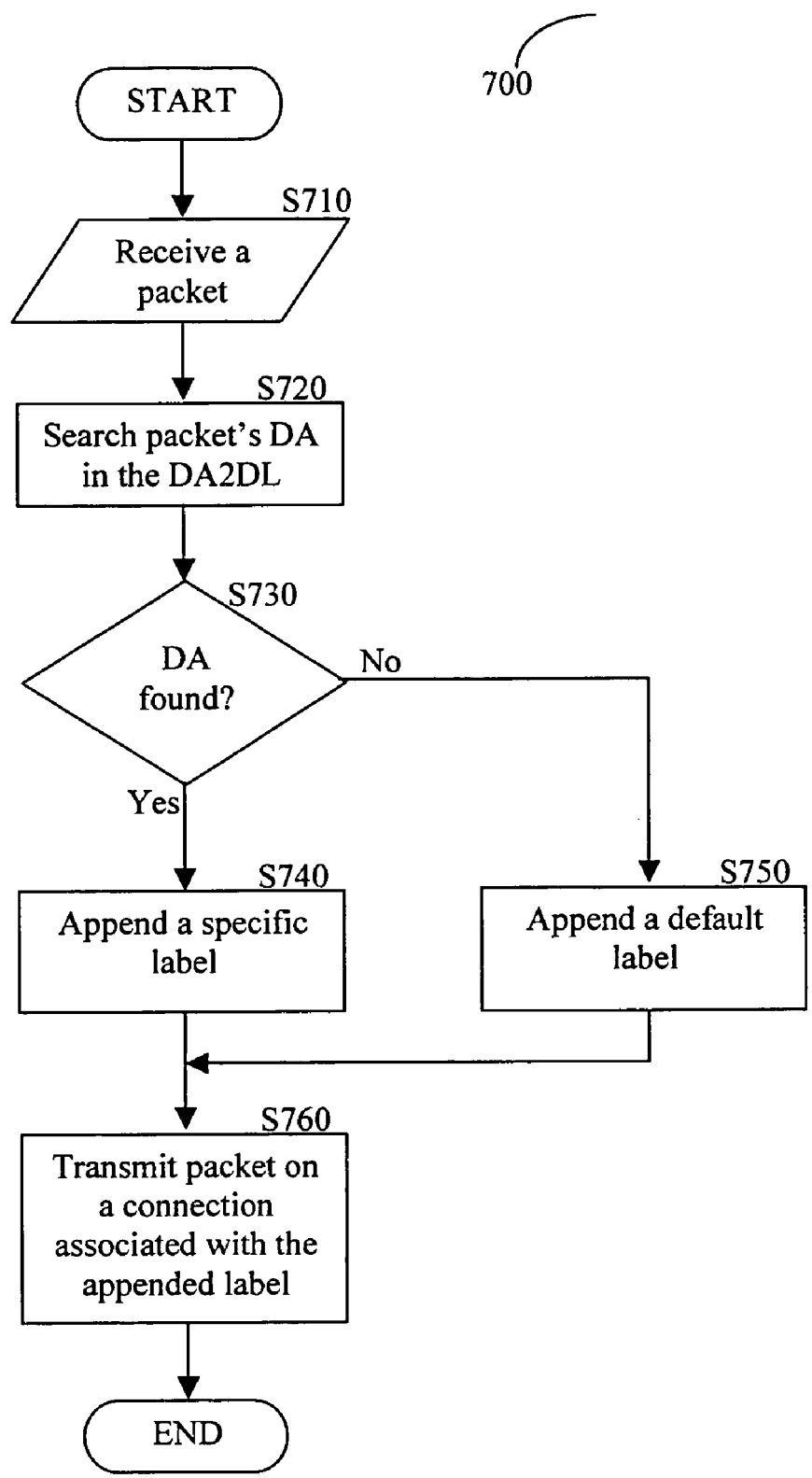
FIG. 7 is a non-limiting flowchart describing the operation of a VPLS in accordance with the present invention.

FIG. 7 shows a non-limiting flowchart 700 that describes the method for handling packets received at a source NE. The method will be described hereafter with reference to the VPLS. However, this is only for exemplary purposes and should not be viewed as limiting the scope of the disclosed invention. The VPLS is established using the process described in greater detailed with reference to FIG. 4. In step S710, a packet sent from a customer site is received at a source NE (e.g., NE 420-1). In step S720, the source NE searches its DA2DL table 350 to find the destination label associated with the DA designated in the incoming packet. In step S730, a check is performed to determine if a destination label is found in the DA2DL table, and if yes, in step S740 the specific label (i.e., the destination label) found in step S720 is appended to the incoming packet; otherwise, if the DA is unknown or is a broadcast or multicast address, then in step S750, a default label is appended to the received packet. In step S760, the packet is transmitted over a connection associated with the appended label. Each NE that receives this packet handles it according to a predetermine operation mode (i.e., replicate-and-forward, drop, and forward) associated with the packet's destination label. In addition, NE that receives a dropped packet on a P2MP connection tries to associate a P2P connection to a DA using the learning procedure described in greater detail above.

The invention has now been described with reference to a specific embodiment where MPLS transport tunnels are used. Other embodiments will be apparent to those of ordinary skill in the art. For example, the method can be adapted for the use of other transport tunnels, such as generic route encapsulation (GRE), Layer 2 tunnel protocol (L2TP), Internet protocol security (IPSEC), and so on.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for enabling efficient bandwidth utilization of a multipoint network service over a network that includes a plurality of network elements (NEs), comprising the steps of a) setting up a full connectivity between all NEs of the plurality of NEs; and, b) providing the multipoint network service between all of the NEs of the plurality of NEs using said full connectivity, whereby data packets of the multipoint network service are transmitted from one NE that serves as a source NE to at least one other NE that serves as an edge NE via at least one of a direct connection and an intermediate NE, and whereby data packets that need to be flooded are not replicated at said source NE, wherein said step of setting up full connectivity includes establishing a first plurality of point-to-multipoint connections between the source NE and more than one edge NEs, and wherein the step of establishing a first plurality of point-to-multipoint connections between the source NE and the more than one edge NEs includes configuring the intermediate NE in a path of each said point-to-multipoint connection to perform an operation on said data packet selected from the group consisting of a forward operation, a replicate-drop-and-forward operation and a replicate-and-forward operation.

2. The method of claim 1, wherein the step of establishing of a first plurality of point-to-multipoint connections between the source NE and the more than one edge NEs further includes configuring at least one edge NE in a path of each point-to-multipoint connection to perform an operation on said data packet selected from the group of a drop operation, replicate-drop-and-forward and a drop-and-forward operation.

3. The method of claim 2, wherein the step of establishing of a first plurality of point-to-multipoint connections between the source NE and the more than one edge NEs further includes configuring a respective source NE of each point-to-multipoint connection to add a respective default label to each data packet being transmitted over said point-to-multipoint connection.

4. The method of claim 3, wherein the step of providing each data packet with a respective default label by said source NE includes appending said respective default label if a destination address is not designated in said packet or if said destination address is at least one of a multicast address and a broadcast address.

5. The method of claim 4, wherein designating each data packet with a destination address includes designating each data packet with an Ethernet medium access layer (MAC) address.

6. The method of claim 3, wherein configuring is performed by an operator selected from the group consisting of a network management system (NMS), a command line interface (CLI) and a signaling protocol.

7. The method of claim 1, wherein configuring the intermediate NE in said path of each said point-to-multipoint connection to perform a replicate-and-forward function further includes: i. replicating said data packet internally in each intermediate NE, which thereby performs as a replicate-and-forward NE; and ii. sending a copy of said replicated packet to NEs connected to said replicate-and-forward NE.

8. The method of claim 2, wherein configuring each at least one edge NE in said path of each point-to-multipoint connection to perform a drop-and-forward function further includes: i. replicating said data packet internally in each edge. NE, which thereby performs as a drop-and-forward NE; ii. sending a copy of said replicated packet to at least one customer site connected to said drop-and-forward NE; and, iii. sending said data packet to one NE selected from the group of an edge NE and an intermediate NE and connected to said drop-and-forward NE.

9. The method of claim 2, wherein configuring each of said at least one edge NE in said path of each point-to-multipoint connection to perform a replicate-drop-and-forward function further includes: i. replicating said data packet internally in each edge NE, which thereby performs as a drop-and-forward NE; ii. sending a copy of said replicated data packet to at least one customer site connected to said drop-and-forward NE; and, iii. sending said data packet to at least two NEs selected from the group of an edge NE and an intermediate NE, wherein the at least two NEs are connected to said replicate-drop-and-forward NE.

10. The method of claim 1, wherein configuring said at least one intermediate NE in said path of each point-to-multipoint connection to perform a forward function further includes sending an incoming data packet to a NE selected from the group consisting of an edge NE and an intermediate NE, wherein the NE is connected to said intermediate NE that performs said forward function.

11. The method of claim 2, wherein configuring each of said at least one edge NE in said path of each point-to-multipoint connection to perform a drop function further includes sending an incoming data packet to at least one customer site connected to said edge NE that performs said drop function.

12. A method for enabling efficient bandwidth utilization of a multipoint network service over a network that includes a plurality of network elements (NEs), comprising the steps of a) setting up a full connectivity between all NEs of the plurality of NEs: and, b) providing the multipoint network service between all of the NEs of the plurality of NEs using said full connectivity, whereby data packets of the multipoint network service are transmitted from one NE that serves as a source NE to at least one other NE that serves as an edge NE via at least one of a direct connection and an intermediate NE. and whereby data packets that need to be flooded are not replicated at said source NE. wherein said step of setting up full connectivity includes establishing a first plurality of point-to-multipoint connections between the source NE and more than one edge NEs. and wherein said step of setting up full connectivity further includes establishing a second plurality of point-to-point connections between said source NE and every edge NE of the plurality of NEs., wherein establishing a second plurality of point-to-point connections between each source NE and every one of said edge NEs further includes: i. configuring each intermediate NE positioned on a path between each source NE and a respective edge NE to perform a forward action on each packet including said specific label; and, ii. configuring said respective edge NE to perform a drop action on each data packet including said specific label.

13. The method of claim 12, wherein configuring is performed by an operator selected from the group consisting of a network management system (NMS), a command line interface (CLI), and a signaling protocol.

14. The method of claim 12, wherein configuring of each intermediate NE positioned on a path between each source NE and a respective edge NE to perform a forward action on each data packet including said specific label includes sending said data packet to a NE connected to said intermediate NE that performs said forward action.

15. The method of claim 12, wherein configuring of said respective edge NE to perform a drop action on each packet including said specific label includes sending said packet to at least one customer site connected to said edge NE.

16. The method of claim 12, wherein associating each point-to-point connection with a specific label includes appending said specific label by said source NE based on a respective destination address of said data packet.

17. A network element (NE) operative to enable efficient bandwidth utilization of a multipoint network service over a network, comprising: a) a virtual connection selector (VCS) capable of mapping incoming data packets to connections; and, b) a forwarding unit coupled to said VCS and configured to perform a forwarding function on each data packet; whereby said NE may communicate with other NEs that share the multipoint network service over the arbitrary topology network, and wherein said forwarding function is selected from the group consisting of a drop function, a replicate-and-forward function, replicate-drop-and-forward function, a forward function and a drop-and-forward function.

18. The NE of claim 17, wherein said forwarding unit includes: i. a forwarding information table (FIT) that indicates said forwarding functions to be performed per each label; ii. a forwarding mechanism operative to execute said forward function; iii. a drop mechanism operative to execute said drop function; iv. a drop-and-forward mechanism operative to execute said drop-and-forward function; v. a replicate-and-forward mechanism operative to execute said replicate-and-forward function; and, vi. a replicate-drop-and-forward mechanism operative to execute said replicate-and-forward function.

* * * * *